(No Model.)
C. J. KINTNER.
APPARATUS FOR ELECTRICALLY PROPELLED CARS.
No. 492,627. Patented Feb. 28, 1893.
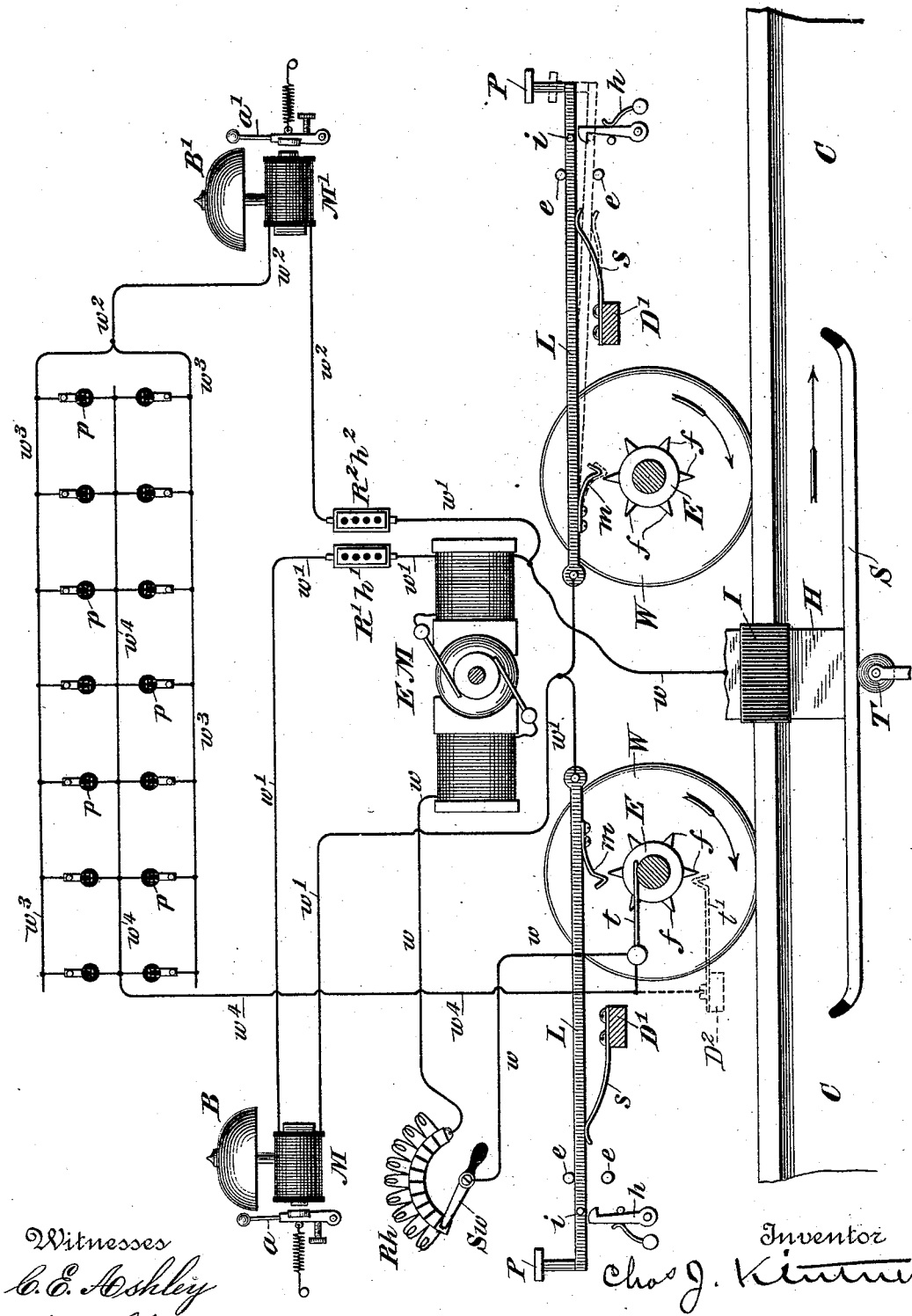
Witnesses
C. E. Ashley
H. W. Lloyd.
Inventor
Chas. J. Kintner

UNITED STATES PATENT OFFICE.

CHARLES J. KINTNER, OF NEW YORK, N. Y., ASSIGNOR OF ONE-THIRD TO GUSTAV STAHL, OF PHILADELPHIA, PENNSYLVANIA.

APPARATUS FOR ELECTRICALLY-PROPELLED CARS.

SPECIFICATION forming part of Letters Patent No. 492,627, dated February 28, 1893.

Application filed July 30, 1892. Serial No. 441,681. (No model.)

*To all whom it may concern:*

Be it known that I, CHARLES J. KINTNER, a citizen of the United States of America, residing at New York, in the county of New York and State of New York, have invented certain new and useful Improvements in Appliances for Use in Connection with Electrically-Propelled Cars or Analogous Moving Vehicles, of which the following is a specification.

My invention is directed especially to the application of alarm or indicating mechanism to moving vehicles and it has for its objects, first the arrangement of an alarm bell or alarm apparatus upon a moving vehicle and operated automatically at the will of an attendant to announce the approach of the vehicle: second the arrangement of circuits and circuit connections in connection with a moving vehicle and an alarm bell or apparatus in such manner that the passengers may call the attention of the attendant or driver to the fact that they desire to have the vehicle stop. I accomplish these objects through the agency of electrically controlled apparatus carried by the vehicle and operating in the manner hereinafter described.

In order that my invention may be fully understood reference is had to the accompanying drawing which is, a diagrammatic view illustrating also in side elevation the wheels of an electrically propelled car together with the circuit and circuit connections and through the propelling electric motor and the apparatus to be hereinafter described.

Referring to the drawing in detail. C represents in side elevation one half of a slitted conduit in which the current main, not shown, is located.

W W represent the truck wheels of a car which sustains in any preferred manner a conducting conduit shoe S adapted to rest upon conducting trolleys T operatively connected with the conducting main or lead after the manner described in my prior application bearing Serial No. 438,114, filed in the United States Patent Office on the 27th day of June, 1892, H being the means of suspension in the nature of a flat hollow sleeve, and I an insulating medium for insulating the part H from the sides of the slit.

$w$ is an insulated conductor running from the trolley shoe S through the propelling electric motor E M and thence to the rheostat R $h$, switch S$w$, contact spring $t$ and axle of the car wheel W. The current passing from the trolley roll as it is depressed by the contact shoe S, wire $w$, electric motor E M, rheostat R$h$, switch S$w$, wire $w$, contact spring $t$, axle of the wheel W through the rail to earth and back to the generator, thus causing the car to move in the direction of the arrow.

On each axle of the car wheels W is a conducting wheel E electrically connected therewith and provided with pointed conducting teeth $f$.

L L are pivoted conducting levers insulated from the body of the car, their free ends being provided with foot pedals P P located near the dash boards of the car and in close proximity to the attendant or driver, either being operative dependent upon the direction of the movement of the car.

$s\ s$ are stiff springs secured beneath the body of the cars by cross bars D′ D′ and adapted to hold the pivoted levers L L in their upper position against the upper limiting stops $e$.

$h\ h$ are hooks or dogs pivotally secured also beneath the floor of the car and adapted to hold or retain the free ends of the levers L in their lower position as shown in dotted lines on the right.

$w'$ is a conductor running from the pivoted ends of the levers L to an electro-magnet M provided with an armature lever $a$ and a bell clapper for ringing the tap bell B. The conductor $w'$ is connected with an adjustable rheostat R′ $h'$ which in turn is joined directly to the main or supply conductor $w$ at a point before it reaches the propelling motor E M.

The operation of this portion of the apparatus is as follows. The car is supposed to be moving in the direction of the arrow and the driver has by placing his foot upon the pedal P forced the lever L into its lower position, thereby locking it through the agency of the hook $h$ against the lower limiting stop pin $e$. This action brought the yielding contact spring $m$ into the path of the conducting points $f$ borne by the wheel E. As the car advances therefore and the wheel W rotates, a derived current will pass by conductor $w$, through conductor $w'$, rheostat $R'$ $h'$, conductor $w'$, bell magnet M, wire $w'$, right hand lever L, contact spring $m$ and each time one of the conducting points $f$ makes contact with the spring $m$, it will flow through the wheel E, car wheel W and return to the generator. As the wheel continues to rotate therefore the bell B will continue to ring, the circuit being interrupted each time one of the points $f$ passes from under the yielding conducting spring $m$. Should the attendant desire to discontinue the ringing of the bell he has simply to force the locking dog or hook $h$ from behind the pin $i$ with his foot, and thereby allow the strong spring $s$ to lift the lever L into its upper position so that the conducting spring $m$ is drawn out of the path of the conducting points $ff$ carried by the wheel E. As electric cars are now manipulated the driver is forced to operate the switch which controls the motor, and at the same time to operate the brakes and mechanically actuated bell and sometimes the trolley pole, all with his hands, and oftentimes on down grades one of his hands is occupied in manipulating the switch, and the other the brake, thus making it impossible for him to ring the mechanically actuated alarm bell. With my arrangement he may use both hands as before and hold the lever L in its lower position with one foot or lock it in the lower position if desired, and afterward release it entirely through the agency of his feet, thereby placing this reliable alarm mechanism wholly under the control of the feet. It will be understood that when the car is moving in the other direction and the driver upon the other platform, the left hand lever L will be manipulated as was that upon the right as heretofore described, and also that should the conductor be upon the rear platform at any time, and desire to attract the attention of the driver, he could do so by depressing the lever at that end and again releasing it after he had communicated the desired signal.

Referring now to the apparatus which is under the control of the passengers for indicating their desires with relation to the movement of the car. $R^2$ $h^2$ is an adjustable rheostat similar to $R'$ $h'$, and $w^2$ is a conductor running from the conductor $w'$ through a bell magnet M' provided with a tap armature $a'$ adapted to ring the bell B', said conductor $w^2$ being joined at its end to a pair of bus wires $w^3$ embedded in the opposite sides of the cars in the rear of the seats, while $w^4$ is a third bus wire operatively connected with two series of push buttons $p$ $p$ or switches of any preferred form and located preferably in the panels between the windows in the rear of the seats, this wire $w^4$ being connected either to the contact spring $t$ or to a second contact spring $t'$ supported on a cross bar $D^2$ and having its free end in the path of the conducting points $f$. The operation of this portion of the apparatus is obvious, it being understood that any passenger may ring the bell B' by operating the switch $p$ nearest to him, thereby closing the derived circuit through the conductor $w^2$, bus wire $w^3$, bus wire $w^4$ and spring $t$ to earth. Should the form of contact spring $t'$ be used, it will be understood that by simply holding any one of the switches $p$ closed for a moment the bell B' will give a series of taps as the contacts $f$ make and interrupt the circuit with the yielding conducting spring $t'$.

I do not limit myself to the special form of apparatus herein shown and described for accomplishing the results sought.

It is obvious that a single bell might be used for accomplishing these results and that the circuit connections might be arranged accordingly. I prefer to use two bells and to make the circuit connections to the electro-magnets thereof, as described. It is also obvious that any form of switching devices may be used between the bus wires $w^3$ and $w^4$, and I should prefer to use a switch which would maintain the circuit closed for a definite length of time and then suddenly rupture it in order to prevent arcing between the electrodes of the switches.

Having thus described my invention, what I claim, and desire to secure by Letters Patent of the United States, is—

1. A stationary source of current supply, a current main operatively connected therewith, a moving vehicle provided with a movable contact operatively connected with the current main and a propelling electric motor carried by the vehicle, an electro-magnetic alarm device having circuit connections with the moving contact and a circuit making and breaking device consisting of a pivoted lever carrying a contacting spring normally out of contact with a circuit breaker E operatively connected to one of the axles of the vehicle with a locking device for locking the lever in operative relation with the circuit breaker E and circuit connections between the motor and the electro-magnetic alarm apparatus with the other pole of the generator, substantially as described.

2. An electrically propelled vehicle carrying an electro-magnetic alarm device having circuit connections with a circuit interrupter operatively connected to one of the axles of the vehicle, in combination with means for bringing said circuit interrupter into operative relation with the alarm and additional means for locking the interrupter permanently in the latter position, substantially as described.

3. An electrically propelled vehicle carrying an electro-magnetic alarm operatively connected with circuit interrupting devices having circuit connections with and through one or more of the wheels of the vehicle, in combination with locking mechanism located at opposite ends of the vehicle for locking the circuit connecting devices in their operative position according as the vehicle is moving in either direction.

4. An electrically propelled vehicle carrying an electro-magnetic alarm device having circuit connections through a circuit interrupter carried by the axle of the vehicle to earth and additional circuit connections to a main or lead through a trolley shoe or conductor also carried by the vehicle, in combination with a locking device adapted to maintain the operative parts of the circuit interrupter in operative relation with each other, whereby the magnetic alarm will act continuously while the vehicle moves when the operative parts of the circuit interrupter are in their locked position, substantially as described.

5. An electrically propelled vehicle carrying two electro-magnetic alarm devices, one of which has circuit connections with a circuit interrupter operatively connected to one of the axles of the vehicle and a locking device for maintaining it in operative condition, while the other is provided with circuit connections running to push buttons located at different points on the inside of the vehicle, substantially as described.

CHARLES J. KINTNER.

Witnesses:
M. M. ROBINSON,
JNO. F. REYNOLDS.